US012586143B2

(12) United States Patent
Peng et al.

(10) Patent No.: US 12,586,143 B2
(45) Date of Patent: Mar. 24, 2026

(54) METHOD, DEVICE, AND PRODUCT FOR GPU CLUSTER

(71) Applicant: Dell Products L.P., Round Rock, TX (US)

(72) Inventors: Wenqing Peng, Dezhou (CN); Tianxiang Chen, Shanghai (CN); Jinpeng Liu, Shanghai (CN); Qiang Chen, Shanghai (CN); Zijia Wang, Weifang (CN)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 18/416,035

(22) Filed: Jan. 18, 2024

(65) Prior Publication Data

US 2025/0217920 A1 Jul. 3, 2025

(30) Foreign Application Priority Data

Dec. 28, 2023 (CN) .......................... 202311836210.X

(51) Int. Cl.
*G06T 1/20* (2006.01)

(52) U.S. Cl.
CPC ...................................... *G06T 1/20* (2013.01)

(58) Field of Classification Search
CPC .......................................................... G06T 1/20
See application file for complete search history.

(56) References Cited

U.S. PATENT DOCUMENTS

2018/0253818 A1* 9/2018 John ....................... G06N 20/00
2019/0034239 A1* 1/2019 Cai ....................... G06F 12/1027

OTHER PUBLICATIONS

Choi, Jaemin, et al. "End-to-end performance modeling of distributed GPU applications." Proceedings of the 34th ACM International Conference on Supercomputing. 2020. (Year: 2020).*
E. Eshelman, "nvidia-smi: Control Your GPUs," https://www.microway.com/hpc-tech-tips/nvidia-smi_control-your-gpus/, Nov. 5, 2018 (Year: 2018).*
Nvidia Corporation, "Nvidia Tesla V100 GPU Architecture," White Paper-080608-001 v1.1, Aug. 2017 (Year: 2017).*
Leung, Allen, et al. "A mapping path for multi-GPGPU accelerated computers from a portable high level programming abstraction." Proceedings of the 3rd workshop on general-purpose computation on graphics processing units. 2010. (Year: 2010).*

(Continued)

*Primary Examiner* — Daniel F Hajnik
*Assistant Examiner* — Thomas John Foster
(74) *Attorney, Agent, or Firm* — Ryan, Mason & Lewis, LLP

(57) ABSTRACT

Illustrative embodiments of the present disclosure include a method, a device, and a product for a Graphics Processing Unit (GPU) cluster. The method includes: obtaining a graph of interconnections between GPUs in the GPU cluster; forming a parallel hierarchical architecture of the GPU cluster based on the graph of interconnections between GPUs; and mapping parallel tasks to the parallel hierarchical architecture to execute the parallel tasks. The method for a GPU cluster according to the present disclosure ensures that high-speed GPU-GPU connection is used for tasks with high communication requirements, thus improving the overall processing efficiency of the GPU cluster.

20 Claims, 5 Drawing Sheets

(56) References Cited

OTHER PUBLICATIONS

Hugging Face, "Efficient Training on Multiple GPUs," https://huggingface.co/docs/transformers/perf_train_gpu_many#dppptp, Accessed Oct. 6, 2023, 24 pages.

Nvidia Corporation, "NVTags," https://developer.nvidia.com/nvidia-nvtags, Accessed Oct. 6, 2023, 2 pages.

E. Eshelman, "nvidia-smi: Control Your GPUs," https://www.microway.com/hpc-tech-tips/nvidia-smi_control-your-gpus/, Nov. 5, 2018, 15 pages.

Nvidia Corporation, "Nvidia Tesla V100 GPU Architecture," White Paper-08608-001 v1.1, Aug. 2017, 58 pages.

* cited by examiner

METHOD, DEVICE, AND PRODUCT FOR GPU CLUSTER

RELATED APPLICATION

The present application claims priority to Chinese Patent Application No. 202311836210.X, filed Dec. 28, 2023, and entitled "Method, Device, and Product for GPU Cluster," which is incorporated by reference herein in its entirety.

FIELD

Various embodiments described herein relate to the field of Graphics Processing Units (GPUs), and more particularly, to a method, a device, and a computer program product for a GPU cluster.

BACKGROUND

At present, GPU has become a popular device type of heterogenous programming. In this programming model, a GPU cluster is adopted. The GPU cluster is equipped with multiple machines, each machine may be composed of multiple nodes, and there may be multiple GPUs in each node. The topology of a GPU cluster will affect the communication cost between GPUs. If inferior communication lines are selected, the parallel efficiency will be greatly reduced, causing data transmission to hinder the computation. In this case, if tasks are assigned to multiple GPUs, the communication between GPUs will also lead to performance problems.

SUMMARY

In view of this, embodiments of the present disclosure provide a method, a device, and a computer program product for a GPU cluster.

According to an aspect of the present disclosure, there is provided a method for a GPU cluster, including: obtaining a graph of interconnections between GPUs in the GPU cluster; forming a parallel hierarchical architecture of the GPU cluster based on the graph of interconnections between GPUs; and mapping parallel tasks to the parallel hierarchical architecture to execute the parallel tasks.

According to another aspect of the present disclosure, there is provided an electronic device, including: a processing unit; and a memory coupled to the processing unit and having instructions stored therein, the instructions, when executed by the processing unit, causing the electronic device to perform actions comprising: obtaining a graph of interconnections between GPUs in a GPU cluster; forming a parallel hierarchical architecture of the GPU cluster based on the graph of interconnections between GPUs; and mapping parallel tasks to the parallel hierarchical architecture to execute the parallel tasks.

According to yet another aspect of the present disclosure, there is provided a computer program product, where the computer program product is tangibly stored on a non-transitory computer-readable medium and includes computer-executable instructions, the computer-executable instructions, when executed by a computer, causing the computer to perform operations comprising: obtaining a graph of interconnections between GPUs in a GPU cluster; forming a parallel hierarchical architecture of the GPU cluster based on the graph of interconnections between GPUs; and mapping parallel tasks to the parallel hierarchical architecture to execute the parallel tasks.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of exemplary embodiments of the present disclosure, provided in more detail herein with reference to the accompanying drawings, the above and other objectives, features, and advantages of the present disclosure will become more apparent. In the exemplary embodiments of the present disclosure, the same reference numerals generally represent the same elements.

DETAILED DESCRIPTION

Figure 1A:
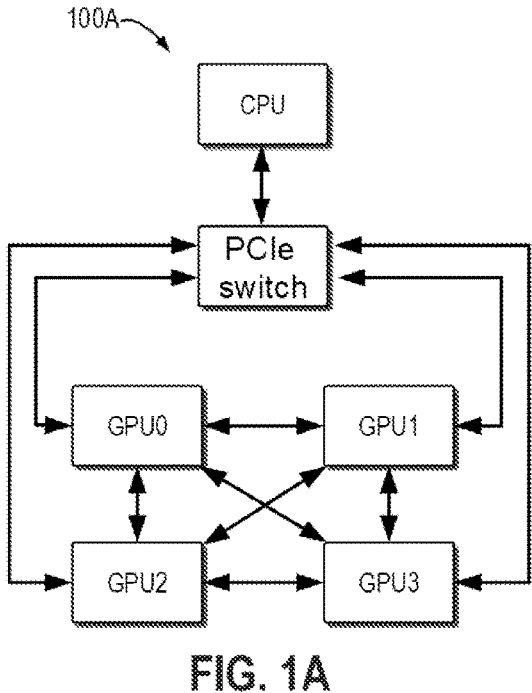
FIG. 1A shows an exemplary GPU cluster according to an embodiment of the present disclosure.

Illustrative embodiments of the present disclosure will be described in more detail below with reference to the accompanying drawings. Although some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects, unless it is clearly stated that the terms refer to different objects.

The following embodiment is taken as an example. Although the specification may refer to "an," "one," or "some" embodiments in some places, this does not necessarily mean that every such reference refers to the same embodiment, or that this feature only applies to a single embodiment. Individual features of different embodiments may also be combined to provide other embodiments. Furthermore, the words "including" and "containing" should not be construed as a limitation that a given embodiment is composed of only those features that have been mentioned, and such an embodiment may also include features/structures that have not been specifically mentioned.

In some embodiments, GPUs may be connected through PCI Express (PCIe). The speed of PCIe depends on the version of the connection and the number of lanes. For example, the 16-lane version 3.0 PCIe connection has a speed of about 16 GB/s. At present, a company has developed a proprietary connection called NVLink with a speed that is also determined by the version and the number of lanes. A Tesla V100 GPU has six lanes, each with a speed of 25 GB/s. Two GPUs can be connected via two NVLink lanes to form a 50 GB/s GPU-GPU connection (hereinafter, also called "connection between GPUs").

As mentioned above, GPUs are connected with each other through connections with different speeds. Some GPUs are directly connected via a high-speed NVLink, while others are connected via PCIe switches (such as the PCIe switch shown in FIG. 1A, and the PCIe switch 0, PCIe switch 1, PCIe switch 2, and PCIe switch 3 shown in FIG. 1B), thus causing longer latency. Therefore, GPU-GPU communications are non-uniform (here, "non-uniform" means that there are noticeable differences (for example, differences in an order of magnitude) in communication speeds between different GPU-GPUs). On the other hand, when parallel operations are performed on a cluster, the parallel operations may have different communication properties, for example, the amounts of data to be transmitted may be different. Therefore, in order to obtain better communication performance on the GPU cluster, it is desirable to place a task with large traffic on a GPU with high interconnection speed. Therefore, a method is needed to reveal (or discover) the interconnection profile of the GPU cluster, and the topology of the GPU cluster and the connection speed between GPUs will provide guidance for task assignment. That is, the interconnection profile of the GPU cluster (for example, the topology and the communication speeds of GPU-GPU interconnection in the GPU cluster) can be obtained, and then tasks are assigned to the appropriate GPUs in the GPU cluster based on the topology of the GPU cluster and the connection speeds between GPUs.

In view of this, according to the present disclosure, a method, a device, and a computer program product for a GPU cluster are provided. Specifically, in some embodiments, a method for a GPU cluster is provided, which includes: obtaining a graph of interconnections between GPUs in the GPU cluster; forming a parallel hierarchical architecture of the GPU cluster based on the graph of interconnections between GPUs; and mapping parallel tasks to the parallel hierarchical architecture to execute the parallel tasks.

With such technical ideas and methods, the method, device, and computer program product for a GPU cluster provided by the present disclosure can ensure that high-speed GPU-GPU connection is used for tasks with high communication requirements, and improve the overall processing efficiency of the GPU cluster.

Basic principles and several exemplary embodiments of the present disclosure are described below with reference to FIGS. 1A to 5. It should be understood that these exemplary embodiments are given only to enable those skilled in the art to better understand and thus implement embodiments of the present disclosure, and are not intended to limit the scope of the present disclosure in any way.

In a GPU cluster with only a few GPUs, each GPU can be directly connected with any other GPU in the cluster at high speed. FIG. 1A shows an exemplary GPU cluster 100A according to an embodiment of the present disclosure. Specifically, in FIG. 1A, the GPU cluster 100A includes four GPUs, namely, GPU0, GPU1, GPU2, and GPU3, all of which are located in the same node, which can be identified by "CPU." Among them, any two GPUs are connected via an NVLink, that is, GPU0 and GPU1, GPU0 and GPU2, GPU0 and GPU3, GPU1 and GPU2, GPU1 and GPU3, and GPU2 and GPU3 are all connected via an NVLink. That is, each GPU in the GPU cluster 100A is directly connected with any other GPU in the cluster at high speed.

Figure 1B:
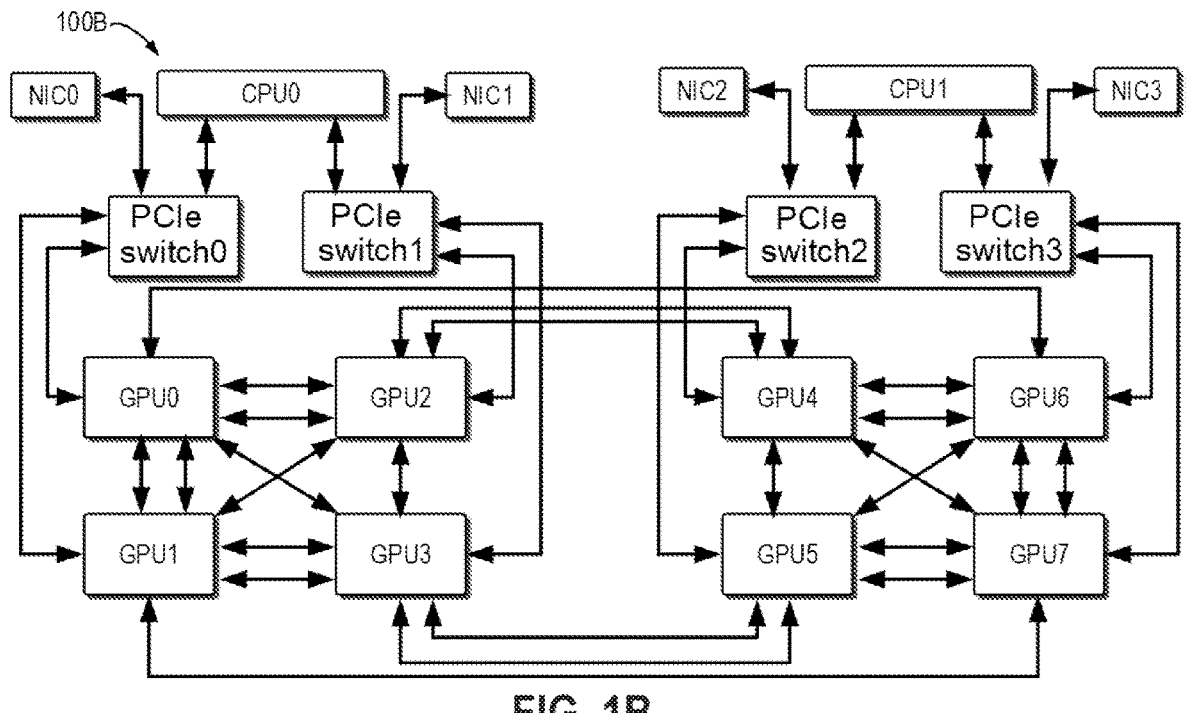
FIG. 1B shows another exemplary GPU cluster according to an embodiment of the present disclosure.

However, if there are many GPUs in a cluster, the topology of connections between GPUs will become complicated, as shown in FIG. 1B. FIG. 1B shows another exemplary GPU cluster 100B according to an embodiment of the present disclosure. The GPUs in the GPU cluster 100B are located in different Non-Uniform Memory Access (NUMA) areas, and the communication across NUMA areas will bring substantial overhead. A cluster may even contain multiple nodes, and the GPUs across the nodes are connected through a slow network connection.

Specifically, the GPU cluster 100B includes eight GPUs, namely, GPU0, GPU1, GPU2, GPU3, GPU4, GPU5, GPU6, and GPU7, which are located in two nodes respectively, where GPU0, GPU1, GPU2, and GPU3 are located in a node, which can be identified by "CPU0"; and GPU4, GPU5, GPU6, and GPU7 are located in another node, which can be identified by "CPU1." As shown in FIG. 1B, in the node "CPU0," as described in conjunction with FIG. 1A, each GPU is directly connected with any other GPU in the node at high speed, for example, GPU0 and GPU2 are connected via two NVLinks. Similarly, in the node "CPU1," each GPU is directly connected with any other GPU in the node at high speed, for example, GPU4 and GPU6 are connected via two NVLinks. At the same time, GPU0 and GPU6 are connected via one NVLink. In addition, CPU0 and CPU1 may be located on two machines connected by a network cable. In this case, for the communication between GPU0 and GPU6, the time cost of the communication between the two machines via the network cable has also to be taken into account.

Figure 2:
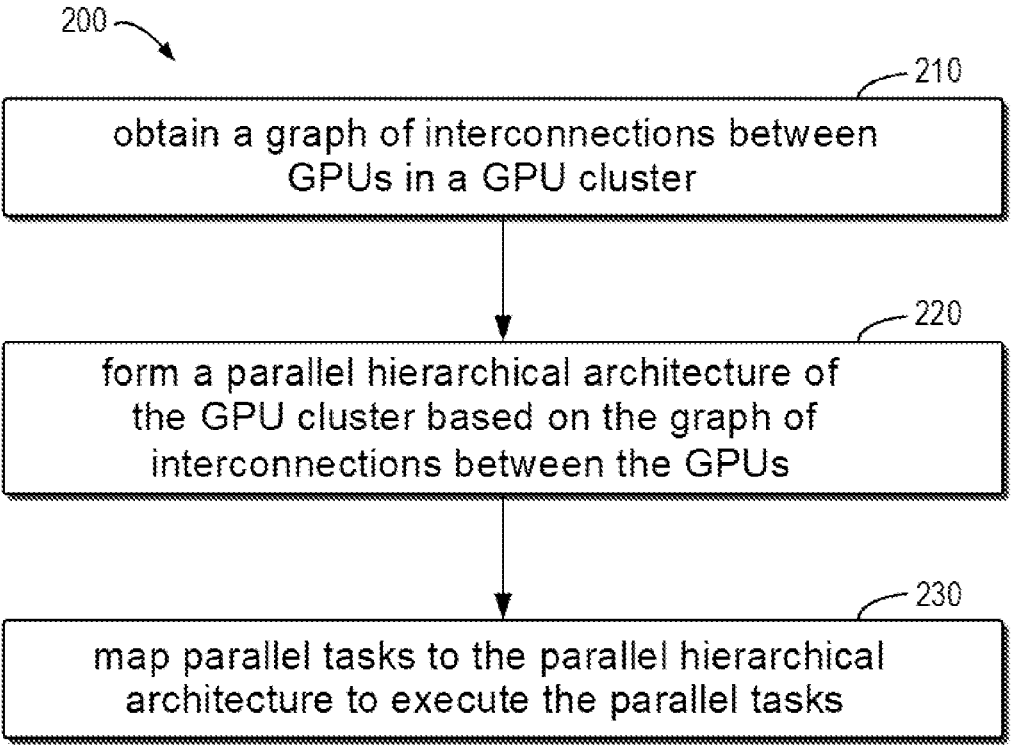
FIG. 2 shows a flow chart of a method for a GPU cluster according to an embodiment of the present disclosure.

FIG. 2 shows a flow chart of an example method 200 for a GPU cluster according to an embodiment of the present disclosure. As shown in FIG. 2, the method of applying hierarchical parallelism on a GPU cluster includes a step of investigating the topology of the cluster to obtain a GPU-GPU interconnection graph, and a step of forming a hierarchical architecture of devices according to the graph and applying a parallelization strategy.

Specifically, as shown in FIG. 2, in an example method 200, in 210, a graph of interconnections between GPUs in the GPU cluster is obtained. The graph of interconnections between GPUs is, for example, shown in FIGS. 1A and 1B. In 220, a parallel hierarchical architecture of the GPU cluster is formed based on the graph of interconnections between GPUs. The parallel hierarchical architecture is, for example, shown in FIG. 3, and will be described in detail later with reference to FIG. 3. In 230, the parallel tasks are mapped to the parallel hierarchical architecture to execute the parallel tasks. This mapping process is shown in FIG. 4 and will be described in detail later with reference to FIG. 4.

Hereinafter, the method for a GPU cluster will be further described with reference to Table 1, FIG. 3, and FIG. 4.

TABLE 1

An example method for discovering the topology of the GPU cluster.

| | GPU0 | GPU1 | GPU2 | GPU3 | GPU4 | GPU5 | GPU6 | GPU7 | mlx5_0 | mlx5_2 | mlx5_1 | mlx5_3 | CPU Affinity |
|---|---|---|---|---|---|---|---|---|---|---|---|---|---|
| GPU0 | X | NV1 | NV1 | NV2 | NV2 | SYS | SYS | SYS | PIX | SYS | PHB | SYS | 0-19, 40-59 |
| GPU1 | NV1 | X | NV2 | NV1 | SYS | NV2 | SYS | SYS | PIX | SYS | PHB | SYS | 0-19, 40-59 |
| GPU2 | NV1 | NV2 | X | NV2 | SYS | SYS | NV1 | SYS | PHB | SYS | PIX | SYS | 0-19, 40-59 |
| GPU3 | NV2 | NV1 | NV2 | X | SYS | SYS | SYS | NV1 | PHB | SYS | PIX | SYS | 0-19, 40-59 |
| GPU4 | NV2 | SYS | SYS | SYS | X | NV1 | NV1 | NV2 | SYS | PIX | SYS | PHB | 20-39, 60-79 |
| GPU5 | SYS | NV2 | SYS | SYS | NV1 | X | NV2 | NV1 | SYS | PIX | SYS | PHB | 20-39, 60-79 |
| GPU6 | SYS | SYS | NV1 | SYS | NV1 | NV2 | X | NV2 | SYS | PHB | SYS | PIX | 20-39, 60-79 |
| GPU7 | SYS | SYS | SYS | NV1 | NV2 | NV1 | NV2 | X | SYS | PHB | SYS | PIX | 20-39, 60-79 |
| mlx5_0 | PIX | PIX | PHB | PHB | SYS | SYS | SYS | SYS | X | SYS | PHB | SYS | |
| mlx5_2 | SYS | SYS | SYS | SYS | PIX | PIX | PHB | PHB | SYS | X | SYS | PHB | |
| mlx5_1 | PHB | PHB | PIX | PIX | SYS | SYS | SYS | SYS | PHB | SYS | X | SYS | |
| mlx5_3 | SYS | SYS | SYS | SYS | PHB | PHB | PIX | PIX | SYS | PHB | SYS | X | |

In Table 1, "X" represents itself, "SYS" represents GPU-GPU connection through SMP interconnection (such as QPI or UPI) between PCIe and NUMA nodes, "NODE" (no specific instances shown in this example table) represents GPU-GPU connection through PCIe and PCIe host bridge in the NUMA node, "PHB" represents GPU-GPU connection through PCIe and host bridge (typically CPU), "PXB" (again no specific instances shown in this example table) represents GPU-GPU connection through multiple PCIe switches (without PCIe host bridge), "PIX" represents GPU-GPU connection through only one PCIe switch, and "NV #" represents GPU-GPU connection through the number # of NVLinks. For example, NV1 represents GPU-GPU connection through one NVLink, and NV2 represents GPU-GPU connection through two NVLinks. The notations "mlx5_" indicate respective distinct instances of four Mellanox InfiniBand adaptors.

Table 1 shows an exemplary method for discovering the topology of a GPU cluster according to an embodiment of the present disclosure. The GPU cluster may be, for example, the GPU cluster 100A shown in FIG. 1A or the GPU cluster 100B shown in FIG. 1B, or it may be another GPU cluster that is more complicated than the GPU cluster 100A and the GPU cluster 100B.

Equipment suppliers provide tools to manage GPUs in the nodes. For example, the topologies of GPU clusters of existing companies can be discovered through the system management interface (e.g. nvidia-smi topo-m). Examples of the output are shown in Table 1. Table 1 lists the connection information between GPU and GPU in the form of tags such as NV1, NV2, and SYS. For example, as shown in Table 1, the interconnection speed of GPU0-GPU1 pair is represented by "NV1," which means that the two GPUs are connected via one NVLink; the interconnection speed of GPU0-GPU3 pair is represented by "NV2," which means that the two GPUs are connected via two NVLinks; the interconnection speed of GPU0-GPU5 pair is represented by "SYS," which means that the two GPUs are connected via the relatively slow PCIe. The communication speeds corresponding to PCIe and NVLink have precise values, but only the order of the speeds in magnitude is considered in the present disclosure. Therefore, the communication speeds corresponding to SYS, NV1, and NV2 are denoted as a, b, and c respectively, where $a \ll b \ll c$, "$\ll$" meaning "much less than," that is, for example, one or more orders of magnitude lower in the index value. That is, the communication speed corresponding to SYS is much lower than that corresponding to NV1 (a GPU pair is connected via one NVLink), and the communication speed corresponding to NV1 is much lower than that corresponding to NV2 (a GPU pair is connected via two NVLinks).

Not only does the GPU connection within a node need to be evaluated, but also the connection with a remote GPU located in an independent networked node needs to be evaluated. When sending information to a remote GPU, the information is first sent to a network adapter on the local node (also called network card or Network Interface Card, see NIC0, NIC1, NIC2, and NIC3 shown in FIG. 1B), which transmits the information to a network adapter on the remote node, and then the remote GPU receives the information from the remote adapter. As shown in FIG. 1B, a node may have multiple network adapters, and the connections between GPU and these adapters are not uniform, because some connections are across NUMA domains. In order to find these differences, first the network route with the IP of the remote node is searched out to find the exit port used. For the connection in the same NUMA domain, its speed is denoted as d; On the contrary, cross-(NUMA) domain connection is denoted as e, $e \ll d$, that is, the communication speed of cross-domain connection is much lower than that of intra-domain connection. In this way, the respective communication costs of the source GPU and the destination GPU in the GPU pair are accumulated.

By evaluating the connection of a GPU pair within and across nodes, a map can be drawn to describe each GPU-GPU connection. The higher the value on the map, the better the connection. This map can be referred to as a score map, and each value is the score of the GPU-GPU connection in terms of bandwidth or latency. Here, bandwidth or latency can represent the communication speed (or communication quality) of the GPU-GPU connection.

Figure 3:
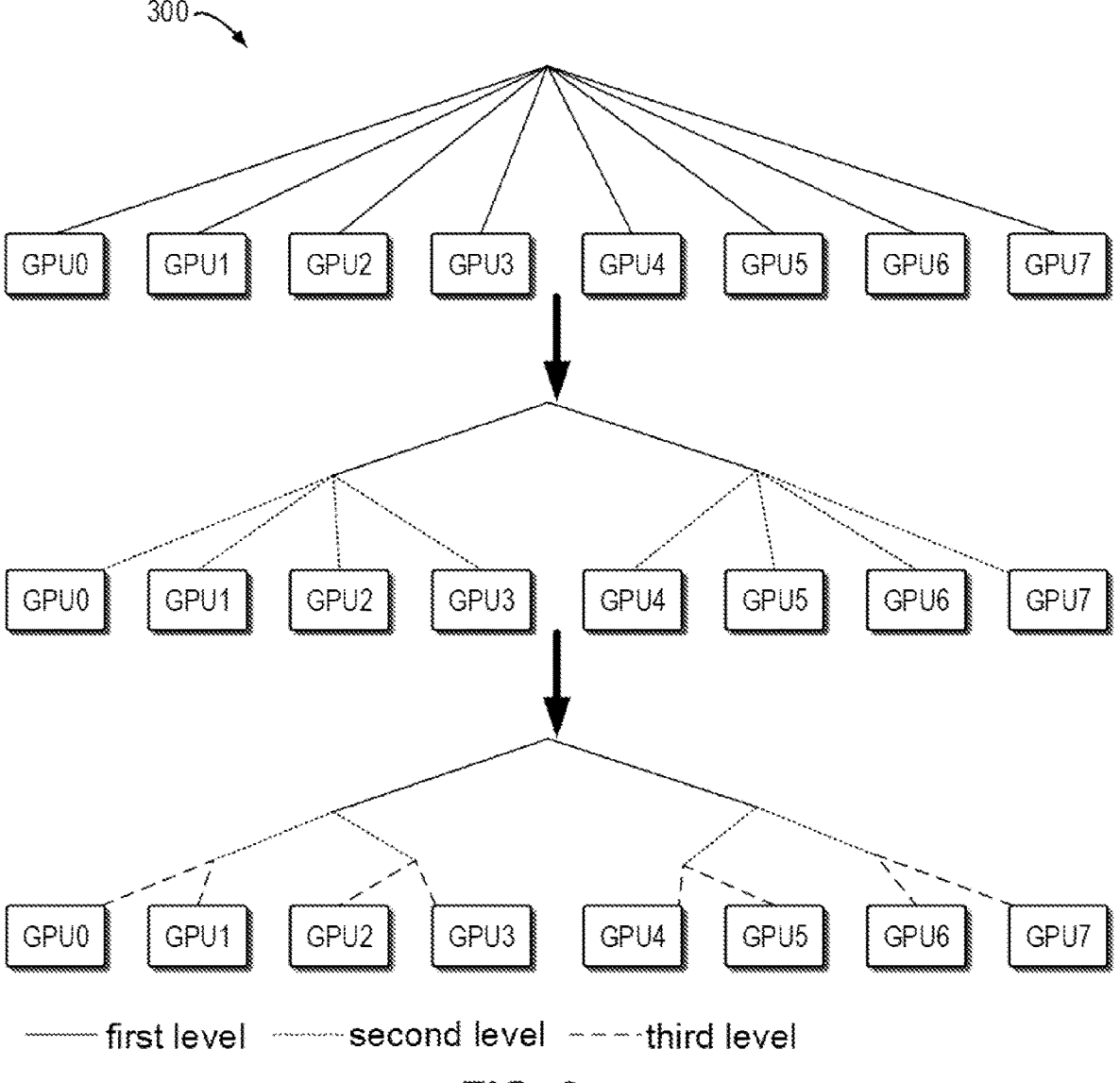
FIG. 3 shows a schematic diagram of a hierarchical parallel structure for recursively establishing a graph of interconnections between GPUs according to an embodiment of the present disclosure.
Figure 4:
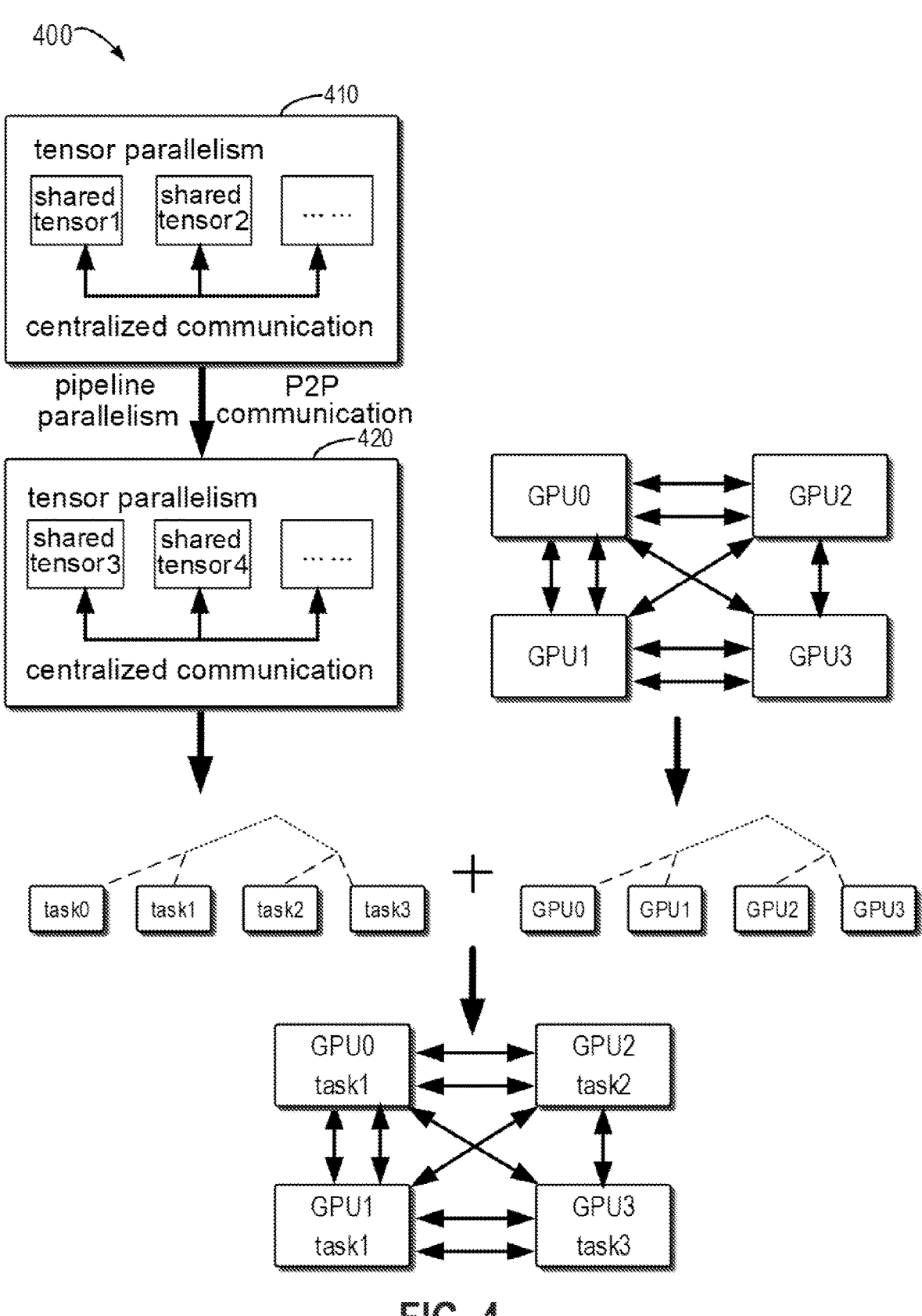
FIG. 4 shows a schematic diagram of mapping parallel tasks to a GPU hierarchical parallel structure according to an embodiment of the present disclosure.

FIG. 3 shows a schematic diagram of a parallel hierarchical architecture 300 for recursively establishing a graph of interconnections between GPUs according to an embodiment of the present disclosure.

First, a fully-connected sub-group is formed. Specifically, the hierarchical structure is formed according to the score map, and its main idea is to classify GPUs with the same or similar good connections into a sub-group. This method takes a GPU list, a score map, and a threshold list as inputs. For each threshold in the threshold list, any two GPUs with the same or better connection can be defined as fully connected GPUs and assigned to one sub-group. Then, the sub-group can be further divided recursively according to a higher threshold in the list.

This method puts all GPUs in the GPU cluster into an initial list, and then compares the connection between two GPUs with the threshold. The principle is to retain a GPU with qualified connection in the current sub-group, and to remove a GPU with unqualified connection from the current sub-group. If (the communication speed of) a connection of a pair of GPUs is lower than the threshold, it can be considered that at least one of the GPUs is not fully connected with other GPUs in the sub-group currently being formed, so it is evicted from the current sub-group. The rule described below can be used to decide which one to evict. The evicted GPU will be buffered in another list for use in subsequent processes.

More specifically, the GPU cluster can be put into a GPU list, and the first GPU in the list can be used as an anchor (also called "anchor point") of the sub-group. Of course, any other GPU in the GPU list can also be used as the anchor of the sub-group. The present disclosure makes no limitation as to which GPU is used as the anchor to form the sub-group. The connections of various pairs of GPUs are compared by the algorithm listed in Table 2 below. When all comparisons are completed, it can be considered that the sub-group is fully interconnected with the anchor point. Then, another buffered list can be processed to form the next sub-group.

TABLE 2

GPU eviction algorithm.
Algorithm 1: comparing the GPU connection with a threshold

```
N ← Size of the group
FOR i = 0 to N:
    FOR j = i+1 to N:
        IF score_map[i][j] < threshold:
            k ← evict(i, j)
            group.remove(k)
            buffer.append(k)
```

Table 2 is pseudo code which schematically represents the GPU eviction algorithm. In this GPU eviction algorithm, for the GPU with index i in the GPU list, for each GPU in the list after it according to the index order (with index j, where j has a value from i+1 to N, N being the number of GPUs in the GPU list), (the communication speed of) the connection between the GPU with index i and the GPU with index j is compared with the threshold. If the connection between the GPUs with indexes i and j is less than the threshold, at least one of the GPUs with indexes i and j is evicted, i.e., removed from the current sub-group, and is buffered in the buffer.

As mentioned above, a partially connected GPU needs to be evicted from the current sub-group. Specifically, when the connection of a pair of GPUs is found to be worse than the threshold, one of them can be evicted according to the following rule. If the pair of GPUs contains an anchor point, the other GPU (that is, the GPU in the pair that is not an anchor point) is evicted to ensure that the anchor point remains in the current sub-group. Otherwise, if the pair of GPUs does not contain the anchor point, then when several GPUs in the list have been processed, that is, i>0 in algorithm 1, it can be confirmed that all the remaining GPUs _ k (k<i) in the list belong to the sub-group. Therefore, first cumulative distances ($\Sigma_{k=0}^{i-1}$ score_map[j][k]) from the confirmed GPUs (i.e., the GPUs that have been confirmed to remain in the current sub-group) can be compared, and the GPU which is farther away (i.e., the GPU whose first cumulative distance is relatively greater) in the pair of GPUs with a connection worse than the threshold is evicted. If the two GPUs in the pair of GPUs with a connection worse than the threshold have the same cumulative distance from the confirmed GPUs, then second cumulative distances ($\Sigma_{k=0}^{len(buffer)}$ score_map[j][k])

between them and the GPUs that have been evicted into the buffer can be calculated respectively, and the GPU with higher affinity (i.e., the GPU having a smaller second cumulative distance from the GPUs that have been evicted into the buffer) in the pair of GPUs with a connection worse than the threshold is evicted. If they have the same affinity with the confirmed GPUs and with the evicted GPUs (that is, if the two GPUs in the pair of GPUs with a connection worse than the threshold have equal first cumulative distances and equal second cumulative distances), they can be considered as the same, and either of them can be evicted.

Specifically, as shown in FIG. 3, for example, it can be assumed that a GPU cluster includes 8 GPUs (for example, the GPU cluster 100B shown in FIG. 1B), and after the GPU cluster is arranged as a GPU list, the GPU eviction algorithm shown in Table 2 above is applied to the 8 GPUs in the list, where N=8. Firstly, the first threshold in the threshold list is used for comparison (i.e., the first threshold is substituted into the "threshold" on the right side of the inequality in "IF score_map[i][j]<threshold") to obtain a first sub-group, which corresponds to the first level in FIG. 3, that is, in the first level in the embodiment shown in FIG. 3, GPU0, GPU1, GPU2, GPU3, GPU4, GPU5, GPU6, and GPU7 belong to the first sub-group. The fact that these GPUs all belong to first sub-group means that these GPUs have comparable communication speeds with each other with respect to the first threshold. In other words, when these GPUs are inter-connected, the communication speeds are all higher than the first threshold, and there is little difference between their communication speeds. Here, the first threshold may be the lowest threshold in the threshold list. In some embodiments, the threshold list can be arranged in the order from small to large, and when the GPU eviction algorithm in Table 2 above is used, the thresholds are taken out from the threshold list in sequence and substituted into the "threshold" on the right side of the inequality.

Next, the second threshold in the threshold list can be used for comparison (that is, the second threshold is substituted into the "threshold" on the right side of the inequality in "IF score_map[i][j]<threshold") to obtain a second sub-group, which corresponds to the second level in FIG. 3, that is, in the second level in the embodiment shown in FIG. 3, GPU0, GPU1, GPU2, and GPU3 and GPU4, GPU5, GPU6, and GPU7 respectively belong to corresponding instances of the second sub-group. Here, the second threshold is greater than the first threshold. The fact that GPU0, GPU1, GPU2, and GPU3 belong to the second sub-group means that GPU0, GPU1, GPU2, and GPU3 have comparable communication speeds with each other. In other words, if GPU0, GPU1, GPU2, and GPU3 are interconnected, the communication speeds are all higher than the second threshold, and there is little difference between their communication speeds. The same applies to GPU4, GPU5, GPU6, and GPU7. Here, it is noted that the interconnection between GPU0 and GPU4 passes through the first level (that is, the communication path between GPU0 and GPU4 passes through the first level), that is, the communication speed of the interconnection between GPU0 and GPU4 is lower than the internal path of the second level (for example, the interconnection between GPU0 and GPU2 or the interconnection between GPU4 and GPU6).

Then, the third threshold in the threshold list can be used for comparison (that is, the third threshold is substituted into the "threshold" on the right side of the inequality in "IF score_map[i][j]<threshold") to obtain a third sub-group, which corresponds to the third level in FIG. 3, that is, in the third level in the embodiment shown in FIG. 3, GPU0 and GPU1, as well as GPU2 and GPU3 respectively belong to corresponding instances of the third sub-group, and GPU4 and GPU5, as well as GPU6 and GPU7 respectively belong to corresponding instances of the third sub-group. Here, the third threshold is greater than the second threshold. For example, the fact that GPU0 and GPU1 belong to the third sub-group means that the communication speed of the interconnection between GPU0 and GPU1 is higher than the third threshold, and the communication speed of the interconnection between GPU2 and GPU3 is also higher than the third threshold, and the communication speed of the interconnection between GPU0 and GPU1 is not much different from that of the interconnection between GPU2 and GPU3. The same applies to the interconnection between GPU4 and GPUS and the interconnection between GPU6 and GPU7. Here, it is noted that the interconnection between GPU0 and GPU2 passes through the second level (that is, the communication path between GPU0 and GPU2 passes through the second level), that is, the communication speed of the interconnection between GPU0 and GPU2 is lower than the internal path of the third level (for example, the interconnection between GPU0 and GPU1 or the interconnection between GPU2 and GPU3). In addition, the interconnection between GPU0 and GPU4 passes through the second level and the first level (that is, the communication path between GPU0 and GPU4 passes through the second level and the first level), so the communication speed of the interconnection between GPU0 and GPU4 is lower than that of the internal path of the third level (for example, the interconnection between GPU0 and GPU1 or the interconnection between GPU2 and GPU3).

FIG. 4 shows a schematic diagram 400 for mapping parallel tasks to a GPU hierarchical parallel structure according to an embodiment of the present disclosure.

Due to memory constraints, training/reasoning of a large language model (LLM) on a single GPU is sometimes too slow or even impossible. When assigning tasks to multiple GPUs, it is necessary to carefully design the task division to make full use of the computing power and communication channels of GPUs. Common design patterns include data parallelism, tensor parallelism, and pipeline parallelism.

Among them, data parallelism puts duplicated models on multiple GPUs and partitions the data, and each GPU has only one slice. Each GPU uses its local data partition for computation and is updated synchronously with other GPUs. Tensor parallelism is suitable for cases where the amount of computation is too large for one GPU. It splits the tensor on multiple GPUs, computes each part in parallel, and updates synchronously at the end of each step. Pipeline parallelism divides the model into multiple pipeline stages. Each stage only contains several layers of the model, and the stages are distributed on multiple GPUs. Once the computation is completed in the previous stage, the data will be sent to another GPU for use in subsequent stages.

These parallelism modes can be used not only individually, but also in combination to further improve the parallelism speed. For example, a model can be split into multiple stages first, and then each operator in a pipeline stage can be further parallelized with tensor parallelism to form a hierarchical parallelism plan. As shown in FIG. 4, in each tensor parallelism module, the shared tensors are processed in parallel with each other. For example, the tensor parallelism module 410 includes multiple tensors, namely, shared tensor 1, shared tensor 2, . . . , which are processed in parallel with each other in a tensor parallelism manner. Similarly, the tensor parallelism module 420 also includes multiple tensors, namely, shared tensor 3, shared tensor 4, . . . , which are also processed in parallel with each other in a tensor parallelism manner. The tensor parallelism module 410 and the tensor parallelism module 420 can communicate with each other in a P2P (point-to-point) manner, and the communication can be processed in parallel in a pipeline parallelism manner.

As mentioned above, hierarchical parallelism planning is used to design large programs as parallel tasks, which have different communication properties. For example, tensor parallelism needs synchronization at the end of each step, so it will introduce a lot of communication traffic, and relatively little data will be transmitted between pipeline stages. In order to simplify the arrangement of hierarchical parallel tasks, a method is needed to divide the whole cluster into sub-groups, in which the GPU-GPU connection within sub-groups is excellent and the connection across sub-groups is poor. The sub-group may contain sub-groups of finer granularities, forming a hierarchy, so that tasks can be easily mapped into sub-groups. Existing companies provide tools that can be used to optimize the matching (mapping) between processing processes and GPUs according to the communication properties of programs and clusters. However, such tools are limited to MPI processes and are proprietary tools.

Specifically, according to the method of the present disclosure, as shown on the right side of FIG. 4, the GPU cluster (regarding a GPU cluster, refer to the GPU cluster 100A shown in FIG. 1A and the GPU cluster 100B shown in FIG. 1B) is recursively divided to establish its hierarchical structure. After the first division is completed using the lowest threshold, the sub-group can be divided into sub-groups of finer granularities using a higher threshold, and finally sub-groups of fine granularities with a tree structure is formed. The levels of the hierarchy (also called "parallel hierarchical architecture" in the present disclosure) are determined by the number of thresholds, so it is limited by the type of connection between GPUs. The specific process of constructing a GPU parallel hierarchical architecture can be found in FIG. 3 and description thereof. Here, as shown on the right side of FIG. 4, GPU0 and GPU2 are connected via two NVLinks, GPU1 and GPU3 are connected via two NVLinks, and GPU0 and GPU1, GPU0 and GPU3, and GPU2 and GPU3 are connected via one NVLink.

When running parallel programs (that is, parallel tasks) on the GPU parallel hierarchical architecture obtained by dividing the GPU cluster into sub-groups, it is necessary to map the hierarchy of parallel tasks to the hierarchy of devices. For example, as shown on the left side of FIG. 4, based on the information related to tensor parallelism and pipeline parallelism, a program can be divided into four parallel tasks (namely, task 1, task 2, task 3, and task 4), and it is known through analysis that, compared with other tasks, more data is exchanged between task 1 and task 2 and between task 3 and task 4. Therefore, as shown on the lower part of FIG. 4, task 1 can be fixed (mapped) to GPU0 (i.e., task 1 can be assigned to GPU0), and task 2 can be fixed (mapped) to GPU2 (i.e., task 1 can be assigned to GPU2) to avoid transmitting a large amount of data in inferior communication channels. Similarly, task 3 and task 4 can be mapped to GPU1 and GPU3 respectively, so as to transmit a large amount of data through a high-quality communication channel with high communication speed.

It is noted that in the embodiment shown in FIG. 4, there are two levels in the GPU parallel hierarchical architecture, and there are also two levels of parallel tasks, so parallel tasks can be directly mapped to GPUs in the GPU parallel hierarchical architecture according to the levels. When the hierarchy of the device group (i.e., GPU parallel hierarchical architecture) contains more levels than the hierarchy of parallel tasks, parallel tasks can also be easily mapped to GPUs in the GPU parallel hierarchical architecture. Specifically, in this case, some levels of the GPU parallel hierarchical architecture can be merged. For example, for the GPU parallel hierarchical architecture shown in FIG. 3, first the first level and the second level can be merged, or the second level and the third level can be merged, and then the parallel tasks shown in FIG. 4 (i.e., task 1, task 2, task 3, and task 4) can be mapped to the appropriate GPUs in the merged GPU parallel hierarchical architecture. For example, taking merging of the third level and the second level as an example, the merged GPU parallel hierarchical architecture actually becomes the second hierarchy at the middle of FIG. 3 in this case. In this case, as mentioned above, GPU0, GPU1, GPU2, and GPU3 and GPU4, GPU5, GPU6, and GPU7 belong to the second sub-group, respectively. Therefore, for example, task 1 and task 2 can be mapped to GPU0 and GPU1 respectively, and task 3 and task 4 can be mapped to GPU2 and GPU3 respectively. In this way, it is possible to avoid using a relatively low-speed GPU-GPU connection to handle tasks with high communication requirements, and ensure that a high-speed GPU-GPU connection is used for tasks with high communication requirements, thus improving the overall processing efficiency of the GPU cluster.

In practical applications, the number of levels of the hierarchy of devices is usually small, so the combined levels of the hierarchy of devices can be enumerated for matching of the parallel tasks.

Figure 5:
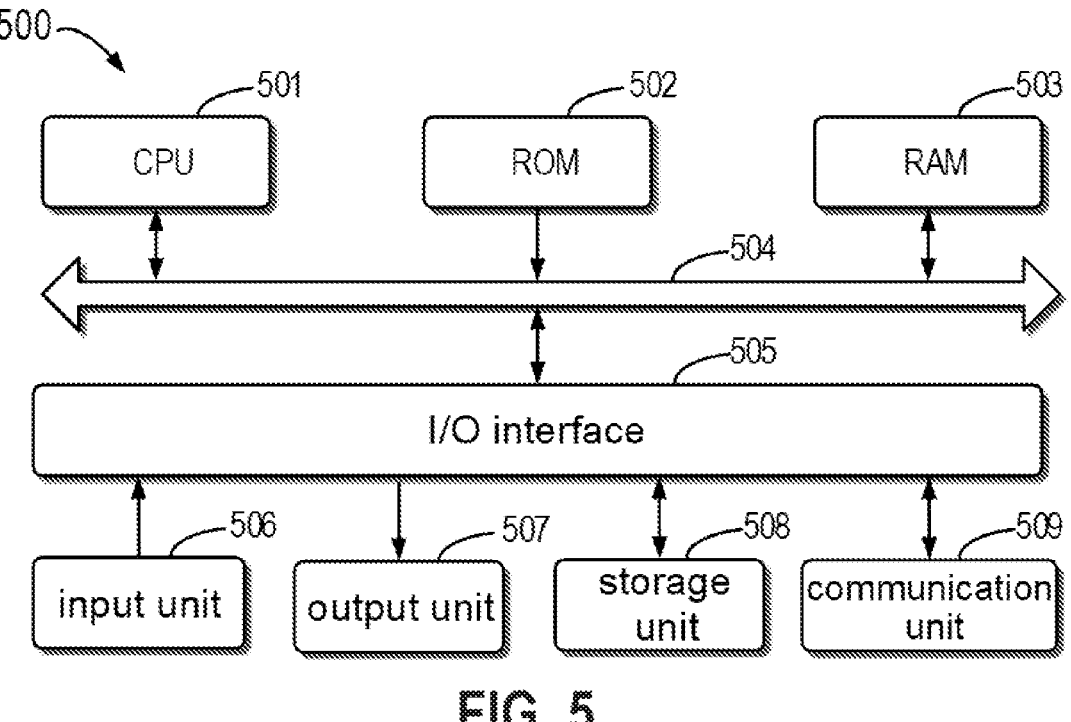
FIG. 5 shows a block diagram of a device that may be used to implement embodiments of the present disclosure.

FIG. 5 is a block diagram of a device 500 that can be used for implementing embodiments of the present disclosure. Device 500 may be a device, apparatus or system described in embodiments of the present disclosure. For example, the device 500 may be any hardware that implements aspects of the present disclosure, such as a server, a device (such as a terminal device), and the like. As shown in FIG. 5, the device 500 includes a central processing unit (CPU) 501 which may perform various appropriate actions and processing according to computer program instructions stored in a read-only memory (ROM) 502 or computer program instructions loaded from a storage unit 508 to a random access memory (RAM) 503. Various programs and data required for operations of the device 500 may also be stored in the RAM 503. The CPU 501, the ROM 502, and the RAM 503 are connected to one another through a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; a storage unit 508, such as a magnetic disk and an optical disc; and a communication unit 509, such as a network card, a modem, and a wireless communication transceiver. The communication unit 509 allows the device 500 to exchange information/data with other devices via a computer network, such as the Internet, and/or various telecommunication networks.

The various methods or processes described above may be performed by the CPU 501. For example, in some embodiments, the method may be implemented as a computer software program that is tangibly included in a machine-readable medium, such as the storage unit 508. For example, in some embodiments, aspects of a device, apparatus or system (or, specifically, a method and/or process embodied therein) may be implemented as a computer software program which is tangibly included in a machine-readable medium such as the storage unit 508. In some embodiments, part of or all the computer program may be loaded and/or installed to the device 500 via the ROM 502 and/or the communication unit 509. When the computer program is loaded into the RAM 503 and executed by the CPU 501, one or more steps or actions of the methods or processes described above may be performed.

As mentioned above, a novel GPU cluster division method is provided in the present disclosure to divide the whole GPU cluster into several sub-groups according to the topology and connection speed. The topology includes connection speed, NUMA area topology, and node topology. Then, a graph is generated to describe the connection quality between any two GPUs. According to the connection quality graph, the whole cluster is divided into several sub-groups. In the process of sub-group division, it is ensured that the quality of GPU-GPU connection within a group is high, while the quality of GPU-GPU connection across groups is low. With the hierarchy of sub-groups, the parallel tasks of hierarchical parallel programs can be fixed to the GPUs. When hierarchical parallelism is applied to cluster division, tasks with high communication requirements will be assigned to nodes in the same sub-group, while tasks residing in different sub-groups exchange a relatively small amount of data. In this way, it is ensured that a high-speed GPU-GPU connection is used for tasks with high communication requirements, thus improving the overall processing speed of the GPU cluster.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that can retain and store instructions to be used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from the network and forwards the computer-readable program instructions for storage in the computer-readable storage medium in each computing/processing device.

The computer program instructions for performing the operations of the present disclosure may be assembly instructions, Instruction Set Architecture (ISA) instructions, machine instructions, machine-related instructions, micro-code, firmware instructions, state setting data, or source codes or object codes written in any combination of one or more programming languages, including object-oriented programming languages as well as conventional procedural programming languages. The computer-readable program instructions may be executed entirely on a user computer, partly on a user computer, as a stand-alone software pack-age, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodi-ments, an electronic circuit, such as a programmable logic circuit, a field programmable gate array (FPGA), or a programmable logic array (PLA), is customized by utilizing status information of the computer-readable program instructions. The electronic circuit can execute the com-puter-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing appara-tus, produce an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium having the instructions stored therein includes an article of manufacture which includes instructions for implementing various aspects of the func-tions/actions specified in one or more blocks in the flow charts and/or block diagrams.

The computer-readable program instructions can also be loaded onto a computer, another programmable data pro-cessing apparatus, or another device, so that a series of operating steps are performed on the computer, the other programmable data processing apparatus, or the other device to produce a computer-implemented process. Therefore, the instructions executed on the computer, the other program-mable data processing apparatus, or the other device imple-ment the functions/actions specified in one or more blocks in the flow charts and/or block diagrams.

The flow charts and block diagrams in the accompanying drawings show the architectures, functions, and operations of possible implementations of the device, the method, and the computer program product according to multiple embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implemen-tations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system execut-ing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodi-ments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for a Graphics Processing Unit (GPU) cluster, comprising:

obtaining a graph of interconnections between GPUs in the GPU cluster;

forming a parallel hierarchical architecture of the GPU cluster based on the graph of interconnections between GPUs; and mapping parallel tasks to the parallel hierarchical archi-tecture to execute the parallel tasks;

wherein obtaining the graph of interconnections between GPUs in the GPU cluster comprises generating scores for respective connections between the GPUs as a function of (i) connection speeds of the respective connections between the GPUs, and (ii) determinations as to whether each such connection is an intra-domain connection or a cross-domain connection; and wherein forming the parallel hierarchical architecture of the GPU cluster based on the graph of interconnections comprises comparing the generated scores for the respective connections to one or more thresholds in order to separate the GPUs in the GPU cluster into one or more sub-groups for use in the mapping of the parallel tasks.

2. The method according to claim 1, wherein obtaining the graph of interconnections between GPUs comprises:

discovering a topology of GPUs in a first node by using a GPU management tool of the first node, wherein the first node comprises GPUs in the GPU cluster; and obtaining first interconnection information of a GPU pair located in the first node in the GPU cluster based on the topology.

3. The method according to claim 2, wherein the first interconnection information comprises communication speed information at different levels between a pair of GPUs.

4. The method according to claim 2, wherein obtaining the graph of interconnections between GPUs further comprises:

obtaining an exit port used by a remote GPU in the GPU cluster by searching for a network route of a second node where the remote GPU is located; and obtaining second interconnection information of a GPU pair to which the remote GPU in the GPU cluster belongs based on whether the other GPU in the GPU pair to which the remote GPU belongs belongs to the same non-uniform memory access (NUMA) domain.

5. The method according to claim 4, wherein the second interconnection information indicates that: when the other GPU in the GPU pair to which the remote GPU belongs belongs to the same NUMA domain, a communication speed of the GPU pair to which the remote GPU belongs is higher than that when the other GPU does not belong to the same NUMA domain.

6. The method according to claim 4, wherein obtaining the graph of interconnections between GPUs comprises:

scoring connections between GPUs in the GPU cluster based on the first interconnection information and the second interconnection information; and obtaining the graph of interconnections between GPUs based on the scores.

7. The method according to claim 6, wherein the score of the connection between GPUs represents the score of the connection between GPUs in terms of bandwidth or latency, and indicates a communication speed of the connection between GPUs.

8. The method according to claim 1, wherein the graph of interconnections between GPUs indicates the order in magnitudes of communication speeds of interconnections between GPUs.

9. The method of claim 6, wherein forming the parallel hierarchical architecture of the GPU cluster comprises:

comparing the scores of the connections between GPUs in the GPU cluster with a first threshold in a threshold list; and determining that the GPUs in one or more GPU pairs with the scores above the first threshold belong to a first sub-group.

10. The method according to claim 9, further comprising:

determining that the score of the connection between GPUs is lower than the first threshold; and evicting at least one of two GPUs in the connection between GPUs from the first sub-group.

11. The method according to claim 10, wherein the connection between GPUs comprises an anchor GPU, and evicting at least one of the two GPUs in the connection between GPUs from the sub-group comprises:

evicting a GPU other than the anchor GPU in the connection between GPUs.

12. The method according to claim 10, wherein the connection between GPUs does not include an anchor GPU, and evicting at least one of the two GPUs in the connection between GPUs from the first sub-group comprises:

comparing first cumulative distances between the two GPUs and the determined GPUs in the first sub-group; and evicting the GPU with the larger first cumulative distance of the two GPUs.

13. The method according to claim 12, wherein the first cumulative distances between the two GPUs and the determined GPUs in the first sub-group are equal, the method further comprising:

comparing second cumulative distances between the two GPUs and the evicted GPUs; and evicting the GPU with the smaller second cumulative distance of the two GPUs.

14. The method according to claim 13, wherein the second cumulative distances between the two GPUs and the determined GPUs in the sub-group are equal, the method further comprising:

evicting either GPU of the two GPUs.

15. The method according to claim 9, wherein forming the parallel hierarchical architecture of the GPU cluster further comprises:

comparing the scores of the connections between GPUs in the GPU cluster evicted by the first sub-group with a second threshold in the threshold list; and determining that the GPUs in the GPU pairs with the scores above the second threshold belong to a second sub-group, wherein the second threshold is different from the first threshold, and the second sub-group is different from the first sub-group.

16. The method according to claim 15, wherein forming the parallel hierarchical architecture of the GPU cluster further comprises:

dividing the GPUs in the first sub-group into a first level of the parallel hierarchical architecture; and dividing the GPUs in the second sub-group into a second level of the parallel hierarchical architecture, wherein the first threshold is less than the second threshold.

17. The method according to claim 16, wherein mapping parallel tasks to the parallel hierarchical architecture comprises:

sorting task pairs in the parallel tasks in a descending order of the amount of exchanged data; and mapping the task pairs to GPU pairs in the GPU cluster starting from a bottom level of the parallel hierarchical architecture.

18. The method according to claim 17, wherein the number of task pairs is less than the number of GPU pairs, the method further comprising:

before mapping the task pairs to the GPU pairs in the GPU cluster starting from the bottom level of the parallel hierarchical architecture, merging some levels in the parallel hierarchical architecture.

19. An electronic device, comprising:

at least one processing unit; and memory coupled to the at least one processing unit and having instructions stored therein, wherein the instructions, when executed by the at least one processing unit, cause the electronic device to perform actions comprising:

obtaining a graph of interconnections between GPUs in a GPU cluster;

forming a parallel hierarchical architecture of the GPU cluster based on the graph of interconnections between GPUs; and mapping parallel tasks to the parallel hierarchical architecture to execute the parallel tasks;

wherein obtaining the graph of interconnections between GPUs in the GPU cluster comprises generating scores for respective connections between the GPUs as a function of (i) connection speeds of the respective connections between the GPUs, and (ii) determinations as to whether each such connection is an intra-domain connection or a cross-domain connection; and wherein forming the parallel hierarchical architecture of the GPU cluster based on the graph of interconnections comprises comparing the generated scores for the respective connections to one or more thresholds in order to separate the GPUs in the GPU cluster into one or more sub-groups for use in the mapping of the parallel tasks.

20. A computer program product comprising a non-transitory computer-readable medium having computer-executable instructions stored therein, wherein the computer-executable instructions, when executed by a computer, cause the computer to perform actions comprising:

obtaining a graph of interconnections between GPUs in a GPU cluster;

forming a parallel hierarchical architecture of the GPU cluster based on the graph of interconnections between GPUs; and mapping parallel tasks to the parallel hierarchical architecture to execute the parallel tasks;

wherein obtaining the graph of interconnections between GPUs in the GPU cluster comprises generating scores for respective connections between the GPUs as a function of (i) connection speeds of the respective connections between the GPUs, and (ii) determinations as to whether each such connection is an intra-domain connection or a cross-domain connection; and wherein forming the parallel hierarchical architecture of the GPU cluster based on the graph of interconnections comprises comparing the generated scores for the respective connections to one or more thresholds in order to separate the GPUs in the GPU cluster into one or more sub-groups for use in the mapping of the parallel tasks.

\* \* \* \* \*